(12) United States Patent
Meriaz et al.

(10) Patent No.: US 8,588,214 B2
(45) Date of Patent: *Nov. 19, 2013

(54) ENHANCED CALLING FEATURES

(75) Inventors: Yoram Meriaz, Holon (IL); Ran Meriaz, Warner Robins, GA (US); Alex Tkachman, Holon (IL)

(73) Assignee: MBTE Holdings Sweden AB

( * ) Notice: Subject to any disclaimer, the term of this patent is extended or adjusted under 35 U.S.C. 154(b) by 674 days.

This patent is subject to a terminal disclaimer.

(21) Appl. No.: 12/708,203

(22) Filed: Feb. 18, 2010

(65) Prior Publication Data

US 2010/0208877 A1 Aug. 19, 2010

Related U.S. Application Data

(63) Continuation of application No. 12/708,121, filed on Feb. 18, 2010.

(60) Provisional application No. 61/153,306, filed on Feb. 18, 2009.

(51) Int. Cl.
*H04L 12/66* (2006.01)

(52) U.S. Cl.
USPC . 370/352; 709/238; 379/201.07; 379/201.08; 379/210.01

(58) Field of Classification Search
USPC ......... 370/352; 709/238; 379/201.07, 201.08, 379/210.01
See application file for complete search history.

(56) References Cited

U.S. PATENT DOCUMENTS

| | | | | |
|---|---|---|---|---|
| 7,123,705 B1 * | 10/2006 | Todd | | 379/202.01 |
| 7,145,998 B1 * | 12/2006 | Holder et al. | | 379/210.01 |
| 7,359,498 B2 * | 4/2008 | Faber et al. | | 379/210.01 |
| 7,376,226 B2 * | 5/2008 | Holder et al. | | 379/210.01 |
| 7,822,186 B1 * | 10/2010 | Boni | | 379/210.01 |
| 8,000,461 B2 * | 8/2011 | Holder et al. | | 379/210.01 |
| 2002/0069249 A1 | 6/2002 | Pedersen | | |
| 2003/0206619 A1 * | 11/2003 | Curbow et al. | | 379/210.01 |
| 2004/0228469 A1 * | 11/2004 | Andrews et al. | | 379/265.03 |
| 2004/0252820 A1 * | 12/2004 | Faber et al. | | 379/201.12 |
| 2005/0084082 A1 * | 4/2005 | Horvitz et al. | | 379/114.06 |
| 2005/0271195 A1 * | 12/2005 | Andrews et al. | | 379/210.01 |
| 2006/0078105 A1 * | 4/2006 | Korn et al. | | 379/210.02 |
| 2007/0121874 A1 * | 5/2007 | Holder et al. | | 379/210.01 |
| 2008/0031436 A1 * | 2/2008 | Der et al. | | 379/201.02 |
| 2008/0170678 A1 * | 7/2008 | Davoust et al. | | 379/201.01 |
| 2008/0212756 A1 * | 9/2008 | Faber et al. | | 379/201.12 |
| 2009/0196410 A1 * | 8/2009 | Mani | | 379/207.03 |

(Continued)

FOREIGN PATENT DOCUMENTS

WO WO 00/22802 4/2000
WO WO 2005/107228 A1 11/2005

OTHER PUBLICATIONS

International Search Report and Written Opinion, Jun. 14, 2010.

*Primary Examiner* — Lisa Hashem
(74) *Attorney, Agent, or Firm* — Alston & Bird LLP

(57) ABSTRACT

Systems, methods, apparatus, and computer program products are provided for scheduling and initiating calls. For example, a request for a prospective call between a caller and a callee can be received via a server. The prospective call can be electronically added to call lists associated respectively with the caller and the callee. In response to a determination that both the caller and the callee are available, a call between a caller device and a callee device can be automatically initiated.

26 Claims, 19 Drawing Sheets

(56) References Cited

U.S. PATENT DOCUMENTS

2010/0054443 A1* 3/2010 Bhattiprolu et al. ..... 379/211.02
2010/0173614 A1 7/2010 Ruelas
2010/0316209 A1* 12/2010 Drovdahl et al. ........ 379/207.16
2012/0075406 A1* 3/2012 Hultkrantz et al. ........ 348/14.01

* cited by examiner

FIG. 10

| User Profile | |
|---|---|
| Name | John Doe |
| Home Phone Number | (212) 555-1212 |
| Work Phone Number | (212) 555-1222 |
| Mobile Phone Number | (212) 555-1232 |
| Skype ID | JohnDoe12 |
| Google ID | John_Doe |
| Jabber ID | John_Doe |
| MSN ID | JohnDoe1975 |
| Primary Email Address | JohnDoe@gmail.com |
| Secondary Email Address | JohnDoe@mail.com |
| Current Call Status | Available Via Mobile Phone Number |

FIG. 11

| My Lucy | | | Welcome alice  Help  Settings  Logout |
|---|---|---|---|

Request Call / Conference

You have a new incoming call request from Johan L. View

☑ Show completed

| | Contact | Subject | Dur. | When | How |
|---|---|---|---|---|---|
| ⇧ | Johan L | Discuss the UI of My Lucy | 10m | today | cell |
| ✉ | Marcus B | Need some help with implementation | 1h | tomorrow | cell |
| ✉ | Alex T | iPhone native application - when? | 25m | tomorrow | cell |
| ⇩ | Johan L | Football game - let's discuss where we're going to watch it. We... | 10m | next week | cell |
| ⇩ | Johan L | Let's talk after your meeting with MacroHard. | 10m | next week | cell |
| ⇩ | Johan L | 15m 2007/01/01 cell Just chat | | | |

All Calls
Planned (3)
Requests (2)

Contacts

ENHANCED CALLING FEATURES

CROSS-REFERENCE TO RELATED APPLICATIONS

This application is a continuation of U.S. application Ser. No. 12/708,121, filed Feb. 18, 2010, which claims priority to U.S. Provisional Application No. 61/153,306, filed Feb. 18, 2009, both of which are hereby incorporated herein in their entirety by reference.

BACKGROUND

With (a) the explosion of devices having the ability to communicate calls and (b) the increasing demands of everyday life, a flexible need exists for scheduling and initiating calls with multiple participants.

BRIEF SUMMARY

In general, embodiments of the present invention provide systems, methods, apparatus, and computer program products for scheduling and initiating calls.

In accordance with one aspect, a computer-implemented method for scheduling and initiating calls is provided. In one embodiment, the computer-implemented method comprises (1) receiving a request for a prospective call, wherein the request for the prospective call (a) defines parameters for the prospective call and (b) identifies participants of the prospective call comprising at least a caller and a first callee; (2) identifying a call list associated with the first callee, wherein the call list identifies a plurality of prospective calls for the first callee; (3) generating a notification to the first callee that notifies the first callee of the request for the prospective call; and (4) in response to generating the notification to the first callee, receiving input (a) accepting or (b) rejecting the request for the prospective call. The computer-implemented method may also comprise (5) in response to receiving input accepting the request for the prospective call, updating the call list of the first callee to reflect acceptance of the prospective call; (6) determining a current call status associated with the caller and a current call status associated with the first callee; and (7) in response to a determination that (a) the current call status associated with the caller indicates that the caller is available and (b) the current call status associated with the first callee indicates that the first callee is available, automatically initiating a call between at least a caller device and a first callee device.

In accordance with another aspect, a computer-implemented method for scheduling and initiating calls is provided. In one embodiment, the computer-implemented method comprises (1) receiving a request for a prospective call, wherein the request for the prospective call (a) defines parameters for the prospective call and (b) identifies participants of the prospective call comprising at least a caller and a first callee; (2) identifying a call list associated with the first callee, wherein the call list identifies a plurality of prospective calls for the first callee; (3) receiving input accepting the request for the prospective call, updating the call list of the first callee to reflect acceptance of the prospective call; (4) determining a current call status associated with the caller and a current call status associated with the first callee; and (5) in response to a determination that (a) the current call status associated with the caller indicates that the caller is available and (b) the current call status associated with the first callee indicates that the first callee is available, automatically initiating a call between at least a caller device and a first callee device.

In accordance with yet another aspect, a computer program product for scheduling and initiating calls is provided. The computer program product may comprise at least one computer-readable storage medium having computer-readable program code portions stored therein, the computer-readable program code portions comprising executable portions configured to (1) receive a request for a prospective call, wherein the request for the prospective call (a) defines parameters for the prospective call and (b) identifies participants of the prospective call comprising at least a caller and a first callee; (2) identify a call list associated with the first callee, wherein the call list identifies a plurality of prospective calls for the first callee; and (3) generate a notification to the first callee that notifies the first callee of the request for the prospective call. The computer-readable program code portions may also comprise executable portions configured to (4) in response to generating the notification to the first callee, receive input (a) accepting or (b) rejecting the request for the prospective call; (5) in response to receiving input accepting the request for the prospective call, update the call list of the first callee to reflect acceptance of the prospective call; (6) determine a current call status associated with the caller and a current call status associated with the first callee; and (7) in response to a determination that (a) the current call status associated with the caller indicates that the caller is available and (b) the current call status associated with the first callee indicates that the first callee is available, automatically initiate a call between at least a caller device and a first callee device.

In accordance with another aspect, a computer program product for scheduling and initiating calls is provided. The computer program product may comprise at least one computer-readable storage medium having computer-readable program code portions stored therein, the computer-readable program code portions comprising executable portions configured to (1) receive a request for a prospective call, wherein the request for the prospective call (a) defines parameters for the prospective call and (b) identifies participants of the prospective call comprising at least a caller and a first callee; (2) identify a call list associated with the first callee, wherein the call list identifies a plurality of prospective calls for the first callee; (3) receive input accepting the request for the prospective call, updating the call list of the first callee to reflect acceptance of the prospective call; (4) determine a current call status associated with the caller and a current call status associated with the first callee; and (5) in response to a determination that (a) the current call status associated with the caller indicates that the caller is available and (b) the current call status associated with the first callee indicates that the first callee is available, automatically initiate a call between at least a caller device and a first callee device.

In accordance with still another aspect, a computer-implemented method for scheduling calls is provided. In one embodiment, the computer-implemented method comprises (1) receiving, via a callee device, a first call originating from a caller device; (2) receiving input, via the callee device, requesting delay of the first call; (3) in response to receiving input requesting delay of the first call, automatically generating and transmitting a request for a prospective call, wherein the request for the prospective call (a) defines parameters for the prospective call and (b) identifies participants of the prospective call comprising at least a caller and a callee; and (4) in response to a determination that (a) a current call status associated with the caller indicates that the caller is available and (b) a current call status associated with the callee indicates that the callee is available, receiving a second call from the caller device.

In accordance with another aspect, a computer-implemented method for scheduling calls is provided. In one embodiment, the computer-implemented method comprises (1) receiving, via a callee device, a first call originating from a caller device; (2) receiving input, via the callee device, requesting delay of the first call; and (3) in response to receiving input requesting delay of the first call, automatically generating and transmitting a request for a prospective call, wherein the request for the prospective call (a) defines parameters for the prospective call and (b) identifies participants of the prospective call comprising at least a caller and a callee.

In accordance with yet another aspect, a computer program product for scheduling calls is provided. The computer program product may comprise at least one computer-readable storage medium having computer-readable program code portions stored therein, the computer-readable program code portions comprising executable portions configured to (1) receive a first call originating from a caller device; (2) receive input requesting delay of the first call; and (3) in response to receiving input requesting delay of the first call, automatically generate and transmit a request for a prospective call, wherein the request for the prospective call (a) defines parameters for the prospective call and (b) identifies participants of the prospective call comprising at least a caller and a callee.

In accordance with still another aspect, a computer-implemented method for scheduling calls is provided. In one embodiment, the computer-implemented method comprises (1) receiving, via a callee device, a first call originating from a caller device; (2) receiving input, via the callee device, accepting the first call; (3) receiving input, via the callee device, requesting continuation of the first call; (4) in response to receiving input requesting continuation of the first call, automatically generating and transmitting a request for a prospective call, wherein the request for the prospective call (a) defines parameters for the prospective call and (b) identifies participants of the prospective call comprising at least a caller and a callee; and (5) in response to a determination that (a) a current call status associated with the caller indicates that the caller is available and (b) a current call status associated with the callee indicates that the callee is available, receiving a second call from the caller device.

In accordance with still another aspect, a computer-implemented method for scheduling calls is provided. In one embodiment, the computer-implemented method comprises (1) receiving, via a callee device, a first call originating from a caller device; (2) receiving input, via the callee device, accepting the first call; (3) receiving input, via the callee device, requesting continuation of the first call; and (4) in response to receiving input requesting continuation of the first call, automatically generating and transmitting a request for a prospective call, wherein the request for the prospective call (a) defines parameters for the prospective call and (b) identifies participants of the prospective call comprising at least a caller and a callee.

In accordance with yet another aspect, a computer program product for scheduling calls is provided. The computer program product may comprise at least one computer-readable storage medium having computer-readable program code portions stored therein, the computer-readable program code portions comprising executable portions configured to (1) receive a first call originating from a caller device; (2) receive input accepting the first call; (3) receive input requesting continuation of the first call; and (4) an executable portion configured to, in response to receiving input requesting continuation of the first call, automatically generate and transmit a request for a prospective call, wherein the request for the prospective call (a) defines parameters for the prospective call and (b) identifies participants of the prospective call comprising at least a caller and a callee.

In accordance with another aspect, a computer-implemented method for scheduling calls is provided. In one embodiment, the computer-implemented method comprises (1) receiving input initiating a first call with a callee device; (2) receiving input requesting continuation of the first call; and (3) in response to receiving input requesting continuation of the first call, automatically generating and transmitting a request for a prospective call, wherein the request for the prospective call (a) defines parameters for the prospective call and (b) identifies participants of the prospective call comprising at least a caller and a callee.

In accordance with still another aspect, a computer program product for scheduling calls is provided. The computer program product may comprise at least one computer-readable storage medium having computer-readable program code portions stored therein, the computer-readable program code portions comprising executable portions configured to (1) receive input initiating a first call with a callee device; (2) receive input requesting continuation of the first call; and (3) in response to receiving input requesting continuation of the first call, automatically generate and transmit a request for a prospective call, wherein the request for the prospective call (a) defines parameters for the prospective call and (b) identifies participants of the prospective call comprising at least a caller and a callee.

In accordance with another aspect, a computer-implemented method for urgent/insistent communication is provided. In one embodiment, the computer-implemented method comprises (1) receiving input initiating a call with a callee device; (2) receiving a notification indicating that (a) the call was rejected by the callee device or (b) the current call status associated with the callee indicates that the callee is unavailable; and (3) in response to receiving the notification indicating that (a) the call was rejected by the callee device or (b) the current call status associated with the callee indicates that the callee is unavailable, automatically causing display of a notification requesting input as to whether the caller would like to (c) create an urgent/insistent message to the callee or (d) initiate an urgent/insistent call to the callee.

In accordance with still another aspect, a computer program product for urgent/insistent communication is provided. The computer program product may comprise at least one computer-readable storage medium having computer-readable program code portions stored therein, the computer-readable program code portions comprising executable portions configured to (1) receive input initiating a call with a callee device; (2) receive a notification indicating that (a) the call was rejected by the callee device or (b) the current call status associated with the callee indicates that the callee is unavailable; and (3) in response to receiving the notification indicating that (a) the call was rejected by the callee device or (b) the current call status associated with the callee indicates that the callee is unavailable, automatically cause display of a notification requesting input as to whether the caller would like to (c) create an urgent/insistent message to the callee or (d) initiate an urgent/insistent call to the callee.

BRIEF DESCRIPTION OF THE SEVERAL
VIEWS OF THE DRAWING(S)

Having thus described the invention in general terms, reference will now be made to the accompanying drawings, which are not necessarily drawn to scale, and wherein:

FIGS. 9-19 are universal input and output produced by one embodiment of the invention.

DETAILED DESCRIPTION

Figure 1:
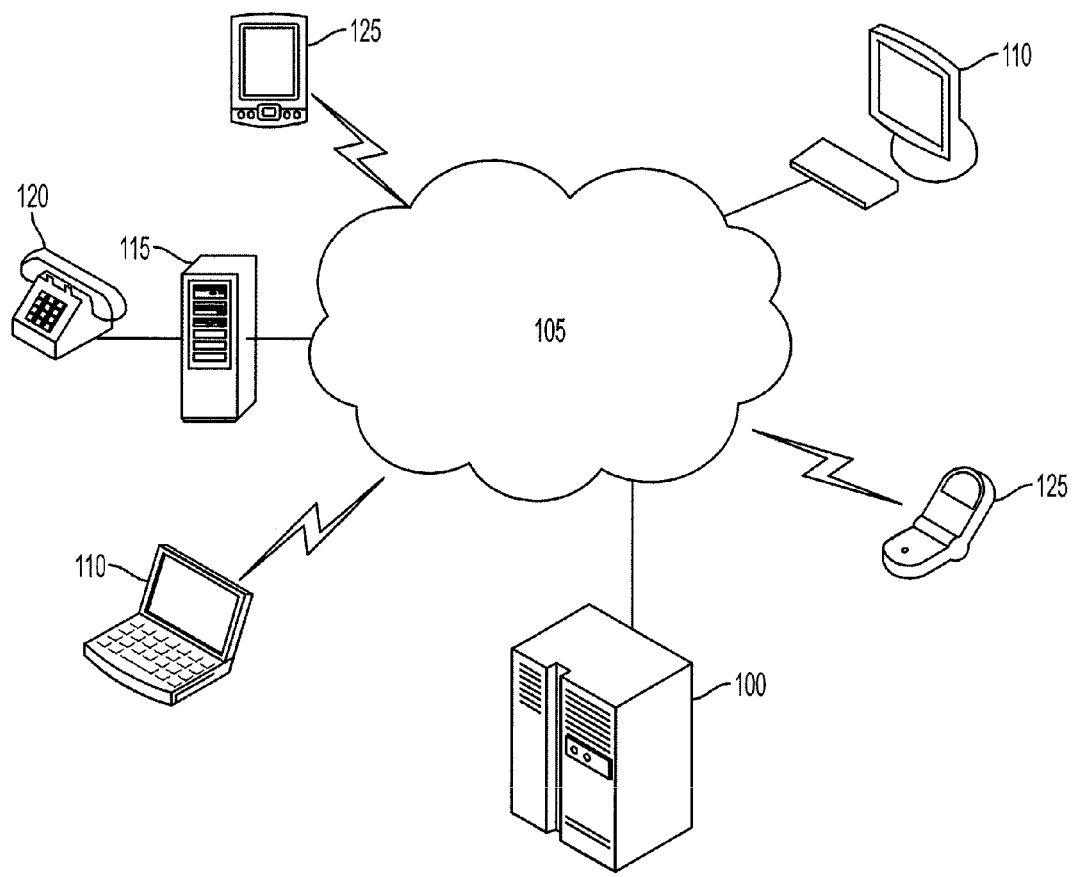
FIG. 1 is an overview of system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

I. METHODS, APPARATUS, SYSTEMS, AND COMPUTER PROGRAM PRODUCTS

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. EXEMPLARY SYSTEM ARCHITECTURE

FIG. 1 provides an illustration of a system that can be used in conjunction with various embodiments of the present invention. As shown in FIG. 1, the system may include one or more call servers 100, one or more networks 105, one or more user computing devices 110, one or more interactive voice response systems 115, one or more telephones 120, and one or more mobile electronic devices 125. Each of the components of the system may be in electronic communication with, for example, one another over the same or different wireless or wired networks including, for example, a wired or wireless Personal Area Network ("PAN"), Local Area Network ("LAN"), Metropolitan Area Network ("MAN"), Wide Area Network ("WAN"), or the like. Additionally, while FIG. 1 illustrates certain system entities as separate, standalone entities, the various embodiments are not limited to this particular architecture.

1. Exemplary Call Server

Figure 2:
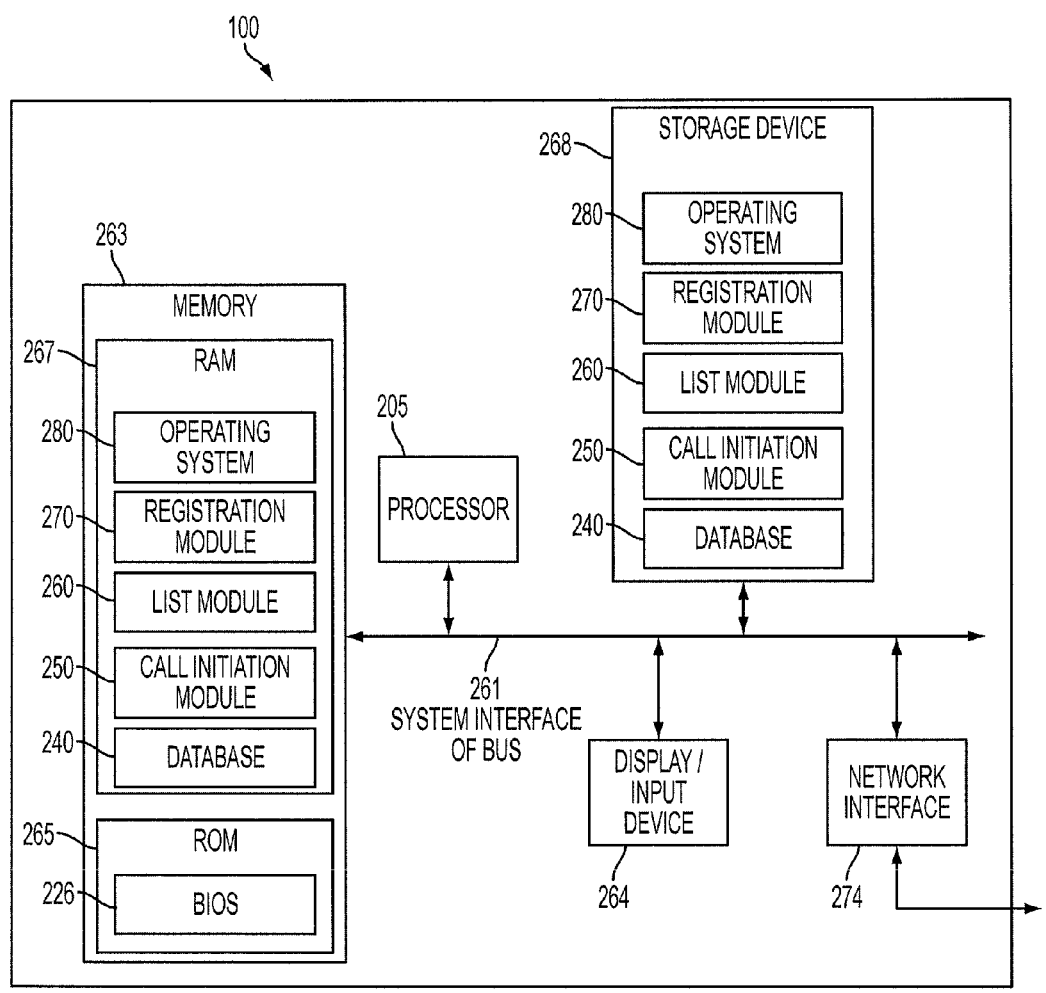
FIG. 2 is an exemplary schematic diagram of a call server according to one embodiment of the present invention.

FIG. 2 provides a schematic of a call server 100 according to one embodiment of the present invention. In general, the term "server" may refer to, for example, any computer, computing device, mobile phone, desktop, notebook or laptop, distributed system, server, blade, gateway, switch, or other processing device adapted to perform the functions described herein. As will be understood from this figure, in this embodiment, the call server 100 includes a processor 205 that communicates with other elements within the call server 100 via a system interface or bus 261. The processor 205 may be embodied in a number of different ways. For example, the processor 205 may be embodied as various processing means such as a processing element, a coprocessor, a controller or various other processing devices including integrated circuits such as, for example, an application specific integrated circuit ("ASIC"), a field programmable gate array ("FPGA"), a hardware accelerator, or the like.

In an exemplary embodiment, the processor 205 may be configured to execute instructions stored in the device memory or otherwise accessible to the processor 205. As such, whether configured by hardware or software methods, or by a combination thereof, the processor 205 may represent an entity capable of performing operations according to embodiments of the present invention while configured accordingly. A display device/input device 264 for receiving and displaying data may also be included in the call server 100. This display device/input device 264 may be, for example, a keyboard or pointing device that is used in combination with a monitor. The call server 100 further includes memory 263, which may include both read only memory ("ROM") 265 and random access memory ("RAM") 267. The call server's ROM 265 may be used to store a basic input/ output system ("BIOS") 226 containing the basic routines that help to transfer information to the different elements within the call server 100.

In addition, in one embodiment, the call server 100 includes at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 268 may be connected to the system bus 261 by an appropriate interface.

Furthermore, a number of program modules may be stored by the various storage devices 268 and/or within RAM 267. Such program modules may include an operating system 280, a registration module 270, a list module 260, and a call initiation module 250. These modules may control certain aspects of the operation of the call server 100 with the assistance of the processor 205 and operating system 280—although their functionality need not be modularized. In addition to the program modules, the call server 100 may store or be connected to one or more databases (e.g., database 240) with one or more tables stored therein.

Also located within the call server 100, in one embodiment, is a network interface 274 for interfacing with various computing entities. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the call server 100 may be configured to communicate via wireless external communication networks using any of a variety of protocols, such as 802.11, general packet radio service ("GPRS"), wideband code division multiple access ("W-CDMA"), or any other wireless protocol.

It will be appreciated that one or more of the call server's 100 components may be located remotely from other call server 100 components. Furthermore, one or more of the components may be combined and additional components performing functions described herein may be included in the call server 100.

2. Exemplary Mobile Electronic Device

Figure 3:
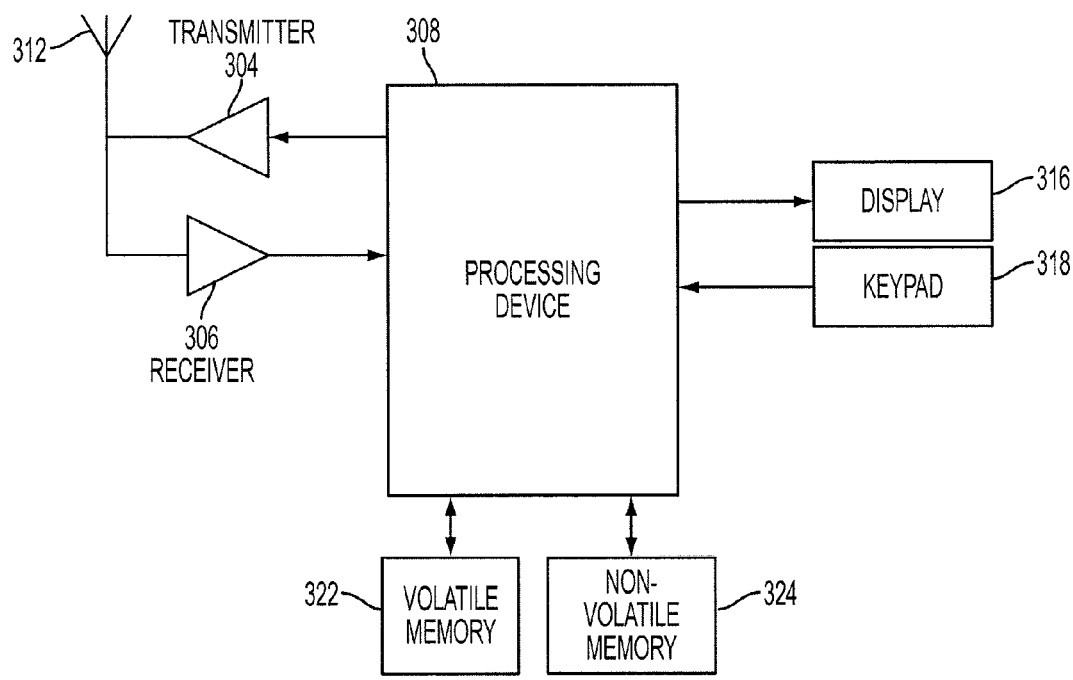
FIG. 3 is an exemplary schematic diagram of a mobile electronic device according to one embodiment of the present invention.

With respect to the mobile electronic device 125 ("handheld"), FIG. 3 provides an illustrative schematic representative of a handheld 125 that can be used in conjunction with the embodiments of the present invention. As shown in FIG. 3, the handheld 125 can include an antenna 312, a transmitter 304, a receiver 306, and means, such as a processing device 308, e.g., a processor, controller, or the like, that provides signals to and receives signals from the transmitter 304 and receiver 306, respectively.

The signals provided to and received from the transmitter 304 and the receiver 306, respectively, may include signaling information in accordance with an air interface standard of applicable wireless systems. In this regard, the handheld 125 may be capable of operating with one or more air interface standards, communication protocols, modulation types, and access types. More particularly, the handheld 125 may operate in accordance with any of a number of second-generation ("2G") communication protocols, third-generation ("3G") communication protocols, fourth-generation ("4G") communication protocols, and/or the like. Further, for example, the handheld 125 may operate in accordance with any of a number of different wireless networking techniques, including Bluetooth, IEEE 802.11 ("Wi-Fi"), 802.16 ("WiMAX"), ultra wideband ("UWB"), and/or the like. Via these communication standards and protocols, the handheld 125 can communicate with the call server 100 and/or various other entities (e.g., user computing devices 110 or telephones 120). The handheld 125 can also download changes, add-ons, and updates, for instance, to its firmware, software (e.g., including modules), and operating system.

The handheld 125 may also comprise a user interface (that can include a display 316 coupled to a processing device 308) and/or a user input interface (coupled to the processing device 308). The user input interface can comprise any of a number of devices allowing the handheld 125 to receive data, such as a keypad 318, a touch display, voice or motion interfaces, or other input device. In embodiments including a keypad 318, the keypad 318 can include the conventional numeric (0-9) and related keys (#, *), and other keys used for operating the handheld 125 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Although not shown, the handheld 125 may also include a battery, such as a vibrating battery pack, for powering the various circuits that are required to operate the handheld 125, as well as optionally providing mechanical vibration as a detectable output.

The handheld 125 can also include volatile memory 322 and/or non-volatile memory 324, which can be embedded and/or may be removable. For example, the non-volatile memory may be embedded or removable multimedia memory cards ("MMCs"), secure digital ("SD") memory cards, Memory Sticks, EEPROM, flash memory, hard disk, or the like. The memory can store any of a number of pieces or amount of information and data used by the handheld 125 to implement the functions of the handheld 125. The memory can also store content, such as computer program code for an application and/or other computer programs.

3. Exemplary Interactive Voice Response System

As shown in FIG. 1, the system may include an interactive voice response system ("IVR"). The IVR may include functionality similar to a traditional IVR, an automated attendant system, and/or a voice response system. Generally, the IVR provides the telephone-based user with the ability, for example, to communicate instructions and/or response via keypads or voice commands.

4. Additional Exemplary System Components

The user computing devices 110 may each include one or more components that are functionally similar to those of the call server 100. For example, in one embodiment, each of the user computing devices may include: (1) a processor that communicates with other elements via a system interface or bus; (2) a display device/input device; (3) memory including both ROM and RAM; (4) a storage device; and (5) a network interface. These architectures are provided for exemplary purposes only and are not limiting to the various embodiments. The term "computing device" is used generically to refer to any computer, mobile phone, computing device, desktop, notebook or laptop, distributed system, server, gateway, switch, or other processing device adapted to perform the functions described herein.

III. EXEMPLARY SYSTEM OPERATION

Reference will now be made to FIGS. 4-19. FIGS. 4-8 provide flowcharts illustrating operations that may be performed to schedule and initiate calls. A call may be, for example, a voice call or text-to-voice call via (a) one or more user computing devices 110 and a telephone 120, (b) a user computing device 110 and a user computing device 110, (c) one or more telephones 120 and one or more handhelds 125, (d) a telephone 120 and a telephone 120, and/or (e) a variety of other combinations. FIGS. 9-19 show universal input and output produced by one embodiment of the invention.

1. User Registration

Figure 4:
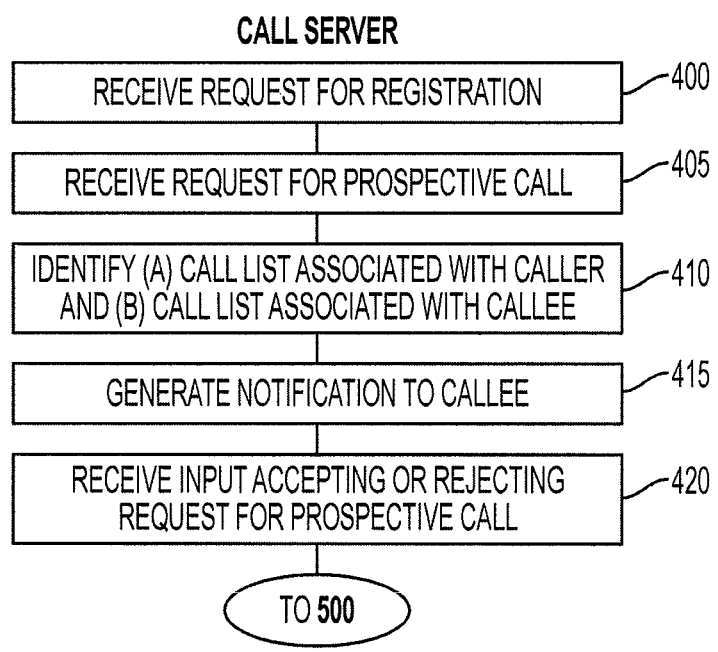
FIGS. 4-8 are flowcharts illustrating operations and processes that can be used in accordance with various embodiments of the present invention.
Figure 5:
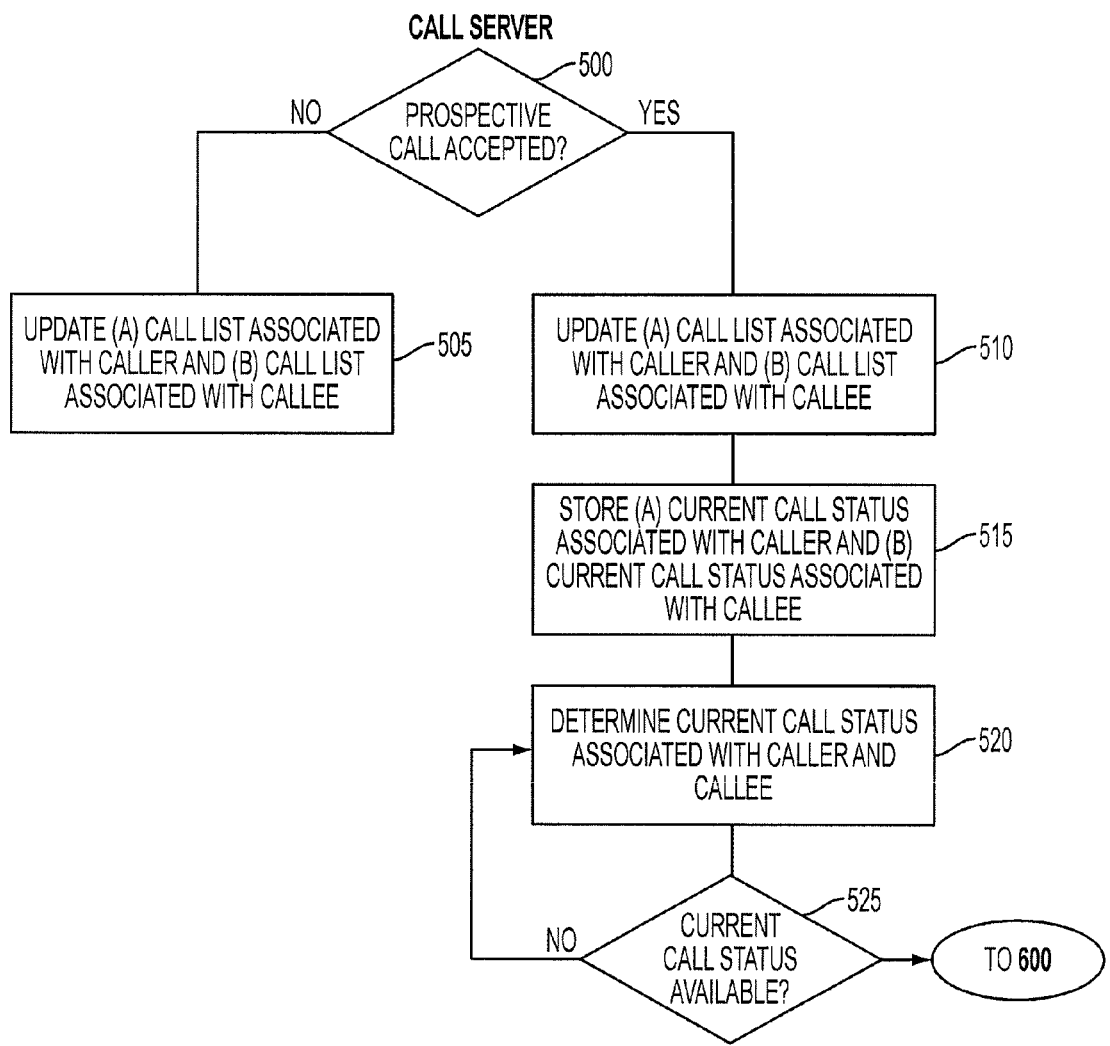

In one embodiment, as shown in Block 400 of FIG. 4, the call server 100 may receive a request to register a user (e.g., such as via a user operating a user computing device 110, a telephone 120 in communication with an IVR 115, or a handheld 125). For example, service providers such as Verizon, AT&T, and Sprint may wish to provide embodiments of the present invention to their customers and require registration to do so. Similarly, retail entities such as Amazon.com and Lowe's may wish to provide embodiments of the present invention to their customers and require registration as well. In certain embodiments, registration may be part of creating a user account, e.g., signing up for wireless service with Verizon or creating an account with Amazon.com for purchases. In embodiments that require registration, each user may be associated with a user profile.

Figure 9:
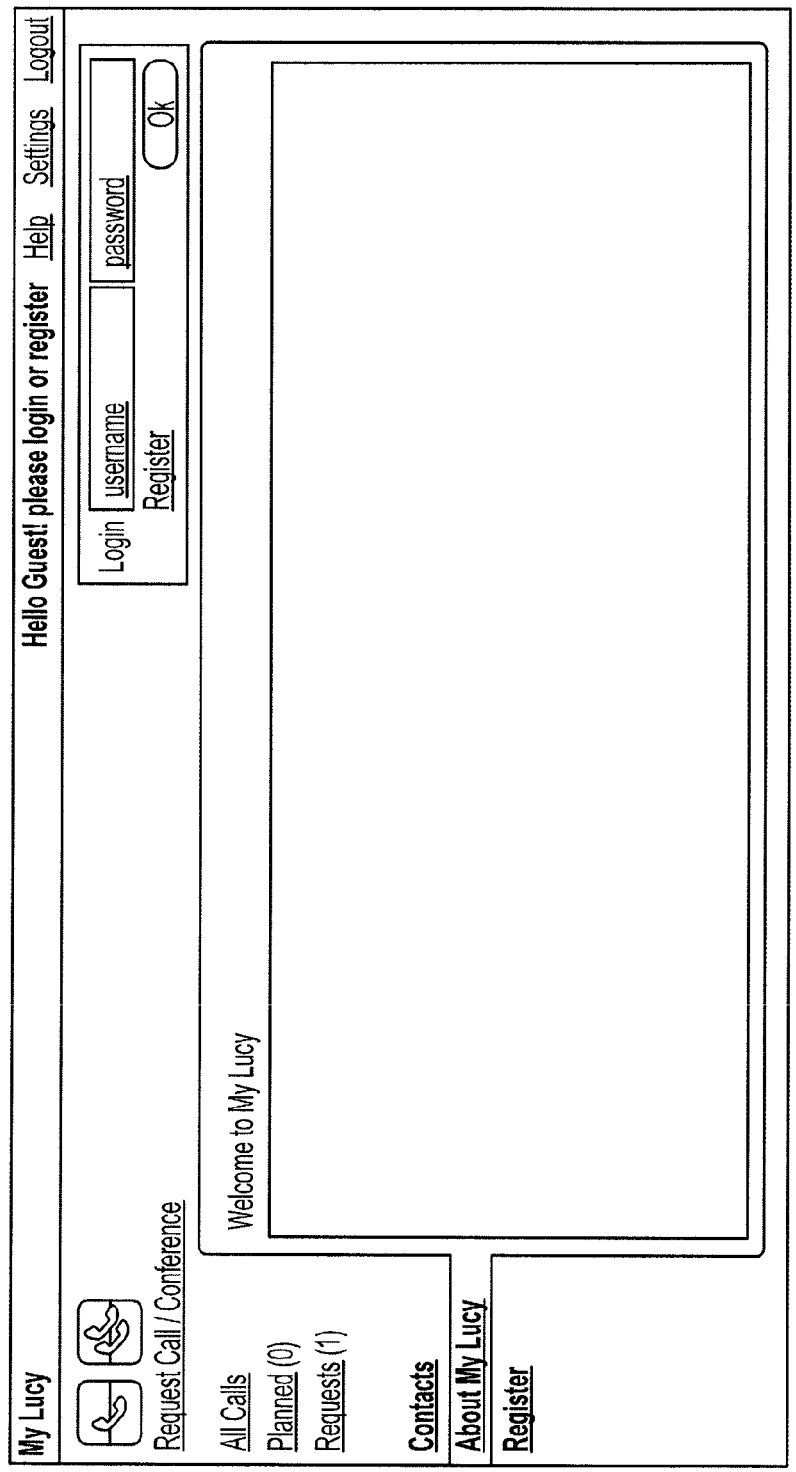
Figure 10:
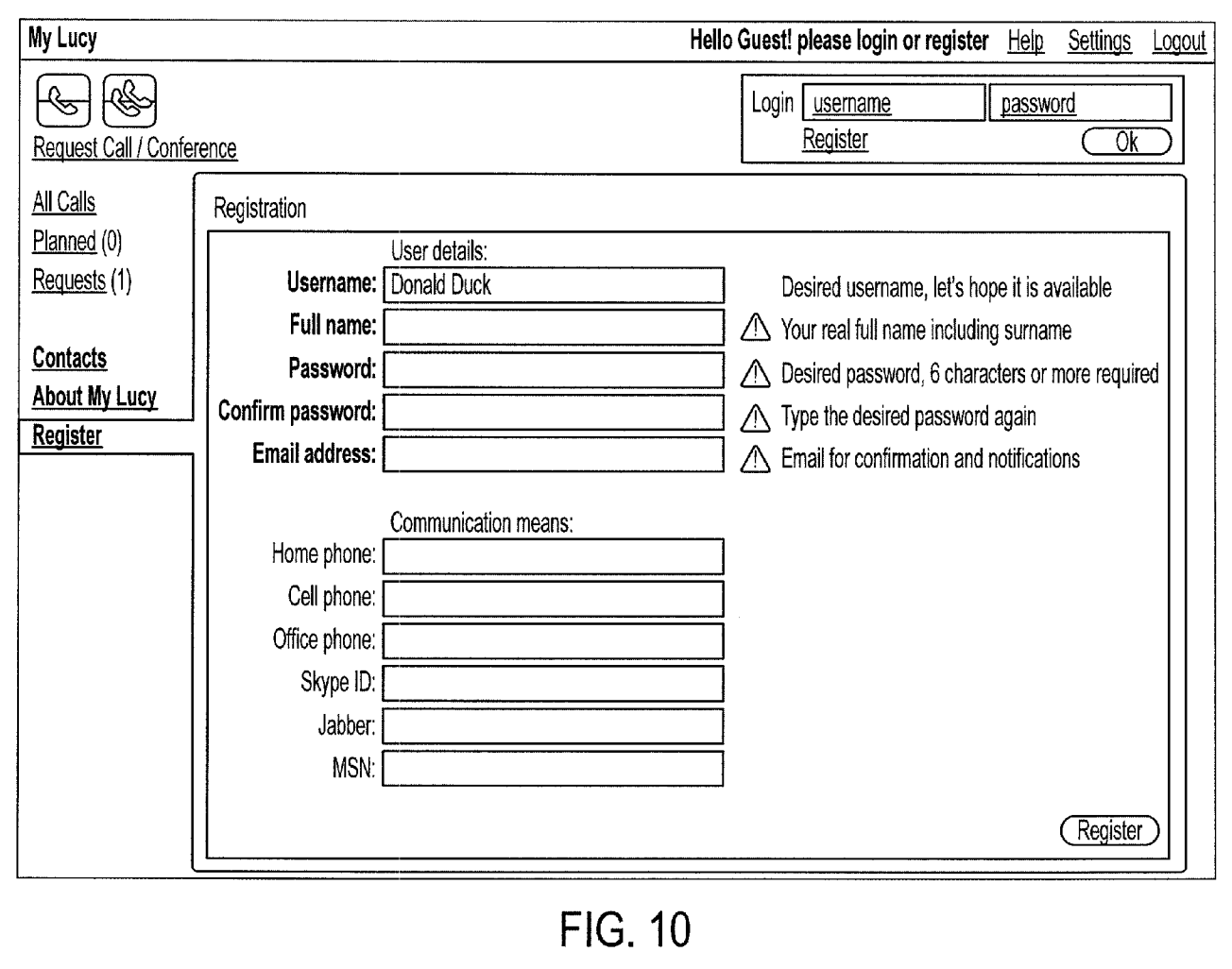

As shown in FIGS. 9 and 10, in various embodiments, a user profile may include a variety of information about the associated user. For example, a user profile may include user information such as (a) username, (b) full name, and (c) password. A user profile may also include information about various communications means associated with a user such as (d) email address(es), (e) home phone number, (f) cellular phone number, (g) office phone number, (h) Skype ID, (i) Jabber ID, (j) MSN ID, (k) Google ID, (l) Twitter ID, (m) system ID, and (n) social network IDs (e.g., a Facebook ID).

In one embodiment, a user profile also includes a current call status that provides an indication as to the user's availability to receive and/or make calls. For example, a user may be available for (a) all calls via all communications means, (b) calls from certain users via her cell phone, (c) unavailable, and/or (d) a variety of other combinations. Similarly, the user may define general parameters for the current call status via the user profile, such as indicating that she is generally available or unavailable at certain times on certain days, e.g., generally being available Monday through Friday from 9:00 am Eastern to 9:00 pm Eastern. In various embodiments, the current call status may be manually updated. For example, a user may manually update her current call status by accessing the call server 100 via a user computing device 110, a telephone 120 in communication with an IVR 115, or a handheld 125. Similarly, the user's current call status may be automatically detected and updated. For example, when a user makes a call, her current call status can be automatically identified as being unavailable and communicated to the call server 100. Correspondingly, when the user completes the call, her current call status can be automatically identified as being available and communicated to the call server 100. As shown in FIG. 11, the call server 100 may store the user profile in association with the user's account, for example, using a database 240. Using the information stored in the various user profiles, the call server 100 can, for example, identify, schedule, and initiate calls.

Although the foregoing describes a registration process, various embodiments of the present invention contemplate implementations that do not require registration. In such implementations, a user may only need to be uniquely identified using, for example, an email address and/or phone number. A variety of approaches and techniques can be used to uniquely identify users.

2. Call Lists

Figure 12:

In one embodiment, each user (e.g., user profile) may be associated with one or more call lists that can be used to schedule and initiate calls. As shown in FIG. 12, a call list may include, for example, a list of prospective calls that are to take place at a future time and/or date. A call list may include prospective calls that (a) have been requested to be made by or received by the user, but have not yet been confirmed/accepted, (b) have been confirmed/accepted to be made by or received by the user, and/or (c) have already been made by or received by the user.

The illustrative call list shown in FIG. 12 comprises five calls: four prospective calls and one completed call. The first prospective call is between Alice and Marcus B. The call list indicates that the first prospective call (a) has been confirmed/accepted, (b) has an identified call subject, (c) has an expected duration of one hour, (d) is scheduled for sometime tomorrow, and (e) will be held by calling Marcus' cellular phone. The second prospective call is between Alice and Alex T. The call list indicates that the second prospective call (a) has been confirmed/accepted, (b) has an identified call subject, (c) has an expected duration of 25 minutes, (d) is scheduled for sometime tomorrow, and (e) will be held by calling Alex's cellular phone. The third prospective call is between Alice and Johan L. The call list indicates that the third prospective call (a) has been confirmed/accepted, (b) has an identified call subject, (c) has an expected duration of 10 minutes, (d) is scheduled for sometime next week, and (e) will be held by calling Johan's cellular phone. The fourth prospective call is also between Alice and Johan L. The call list indicates that the fourth prospective call (a) has been confirmed/accepted, (b) has an identified call subject, (c) has an expected duration of 10 minutes, (d) is scheduled for sometime next week, and (e) will be held by calling Johan's cellular phone. The call list also comprises information regarding a completed call between Alice and Johan L. It should be noted that a call may include more than two users, such as a conference call involving any number of users. For example, a call may include Alice, Marcus, Alex, and Johan.

In one embodiment, the call server 100 stores call lists associated with the various users (e.g., user profiles) of the system. The call lists stored via the call server 100 may be accessed, updated, and retrieved by authorized users in a variety of ways. For example, a user may access her call list by accessing the call server 100 via the operation of a user computing device 110, a telephone 120 in communication with an IVR 115, or a handheld 125. Call lists may also be integrated and/or imported into a variety of applications, including an electronic calendar that allows the user to view her prospective calls as part of her calendar. Moreover, the call lists may be sortable by caller, callee, expected time duration, priority, call subject, communications means, and/or the like.

3. Requests and Updates for Prospective Calls

Figure 13:
Figure 14:

In one embodiment, to schedule a prospective call, the call server 100 receives a request for a prospective call (Block 405). The request for the prospective call may define parameters and identify participants of the prospective call. For example, as shown in FIGS. 13 and 14, the request for the prospective call may include parameters such as (a) a call subject (e.g., Discuss UI of MyLucy), (b) an expected call duration (e.g., 20 minutes), (c) a suggested call date (e.g., Feb.

20, 2012), (d) a suggested call time (e.g., 11:30 am Eastern), (e) a suggested call time window (e.g., between 1:00 pm and 5:00 pm Eastern), (f) a communication means (e.g., Alex's cellular phone or Skype ID), (g) a priority (e.g., requesting completion of calls in a certain order based on priority), (h) one or more conditions (e.g., call Alex only after having completed the call with Johan), and/or the like. The parameters defined in the request for the prospective call can be configured to accommodate a variety of needs and/or preferences. The request for the prospective call may also identify the participants. The participants may be users (e.g., Alex T., Marcus B., and Alice) or commercial entities. For example, a commercial entity such as AT&T may respond to a user's customer service request based on the user's availability as identified by her call list and/or current call status. Similarly, commercial entities desiring to market or sell a good or service to a user may send requests for prospective calls to current or prospective clients.

Requests for prospective calls received by the call server 100 can be generated in a variety of ways—particular embodiments of which are discussed in the following sections.

a. General Requests for Prospective Calls

In one embodiment, a request for a prospective call can be generated by a user creating a request with the aid of a user computing device 110 or a handheld 125. For instance, as shown in FIGS. 13 and 14, a user can populate a form associated with requests for prospective calls. In particular, a user operating a user computing device 110 or a handheld 125 can populate the form via a web interface or an application being executed on a handheld 125. For example, this functionality may be included as a feature in Google Voice, Skype, or chat applications. After populating the form, in one embodiment, the request for the prospective call is transmitted to the call server 100. Alternatively or in addition to, a user can provide the information necessary to generate a request for a prospective call using a telephone 120 in communication with an IVR 115. Thus, for instance, the user can navigate the IVR 115 menu and selections via voice input and/or keyed input to provide information sufficient to generate a request for a prospective call. After receiving the necessary information, in one embodiment, the IVR 115 transmits the request for the prospective call to the call server 100.

b. Incoming Call Delays

Figure 18:
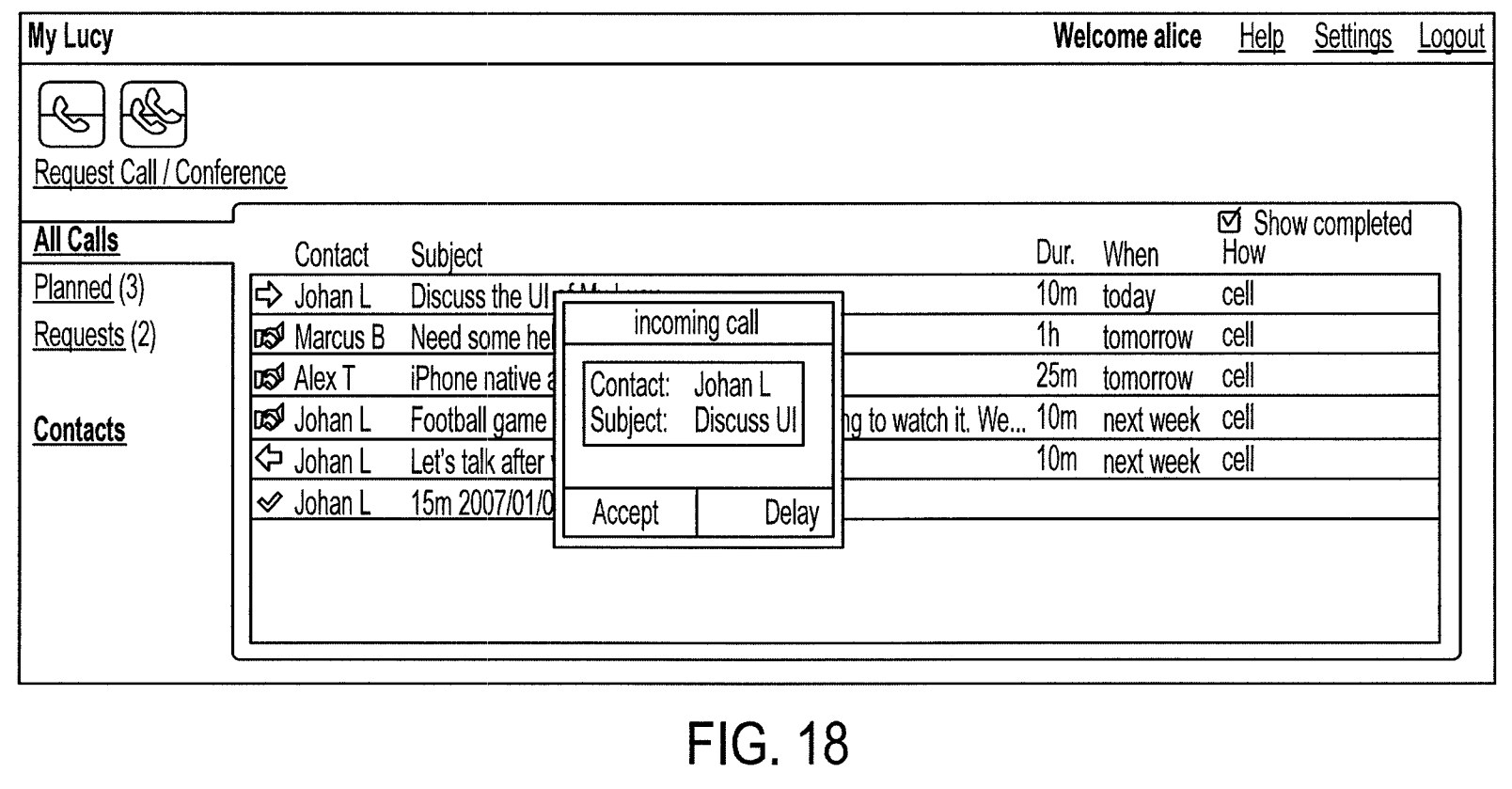
Figure 19:
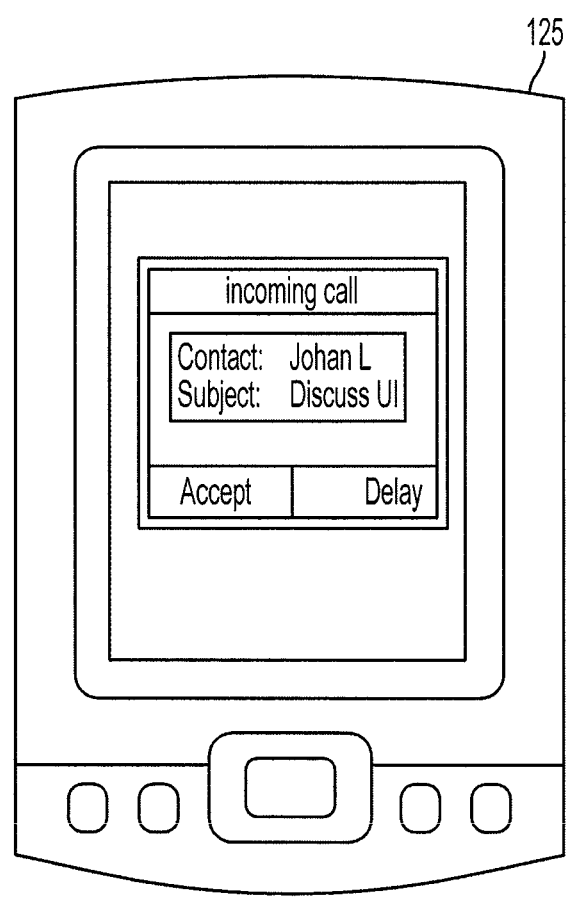

In one embodiment, a request for a prospective call can be generated in response to a user (e.g., callee) delaying an incoming call (e.g., requesting to delay the call until a future time and/or date). For example, as indicated in Block 700 of FIG. 7, a callee device (e.g., user computing device 110, telephone 120, or handheld 125) can receive a call originating from a caller device (e.g., user computing device 110, telephone 120, or handheld 125). In response to the callee device receiving the call, the callee may have the option to the delay the call. For example, as shown in FIGS. 18 and 19, in response to receiving a call, the callee device may provide the callee with options that may include (a) accepting the call, (b) rejecting/ignoring the call, and/or (b) requesting delay of the call. Generally, requesting delay of the call may refer to requesting postponement of the call to a future time and/or date (Block 705). In response to receiving input requesting delay of the call, the callee device (e.g., user computing device 110, telephone 120 in communication with an IVR 115, or handheld 125) may automatically generate and transmit a request for a prospective call (e.g., delaying the call) to the call server 100 (Block 710). The automatically generated request for the prospective call may include default parameters, such as time parameters delaying the call for 20 minutes, 2 hours, or 3 days from the time of the request for the delay. A variety of other default parameters may also be configured to adapt to a variety of needs and preferences.

Operatively, a callee receiving calls may provide input requesting delay of a call in a variety of ways. In one embodiment shown in FIG. 18, a callee receiving an incoming call via a user computing device 110 may provide input requesting delay of the incoming call by clicking a link or selecting a corresponding delay option via an interface. In response to the appropriate input, the user computing device 110 can generate and transmit the request for the prospective call—requesting to delay the call. In another embodiment shown in FIG. 19, a user receiving incoming calls via a handheld 125 may provide input requesting delay of the incoming call by selecting or depressing a soft or hard key on the handheld 125 corresponding to the option for requesting delay. In response to the appropriate input, the handheld 125 can generate and transmit the request for the prospective call. Although not shown, in yet another embodiment, a user receiving incoming calls via a telephone 120 in communication with an IVR 115 may also delay calls. For example, a user operating a telephone 120 in communication with an IVR 115 may receive an incoming call that is preceded by a voice prompt asking the user whether she wishes to delay the call, such as press (a) one to accept the call, (b) two to reject the call, or (b) three to delay the call. In response to the appropriate input, the IVR 115 can generate and transmit the request for the prospective call.

In one embodiment, requests for prospective calls generated and transmitted as a result of delaying incoming calls may or may not require acceptance of the requests to be added to the caller's and callee's respective call lists. For example, the parameters associated with the caller's profile may provide for the automatic inclusion of delayed calls to her call list. Similarly, the parameters associated with the caller's profile may require acceptance of such requests for inclusion of delayed calls to her call list. A variety of other parameters may also be configured to adapt to a variety of needs and preferences.

c. Continuations of Calls

In one embodiment, a request for a prospective call can be generated in response to a user, during a call, requesting continuation of the call at a future time and/or date. For example, as indicated in Block 800 of FIG. 8, a caller device (e.g., user computing device 110, telephone 120, or handheld 125) receives input initiating a call to a callee device (e.g., user computing device 110, telephone 120, or handheld 125). As indicated in Block 805, the callee device then receives the call originating from a caller device. In response to receiving the call, the callee device receives input accepting the call (Block 807). At some point during or after the call, the callee or caller (e.g., user) may desire to continue the call at a future time and/or date. For example, another matter may require the caller's attention or the call may have taken longer than the callee anticipated. Thus, a user (e.g., caller or callee) may input a request to the corresponding device to continue the call. In response, the appropriate device (e.g., caller device or callee device) receives input from the user requesting continuation of the call (Block 810), and, in response, automatically generates and transmits a request for a prospective call to the call server 100 (Block 815)—requesting continuation of the call at a future time and/or date. The automatically generated request for the prospective call may include default parameters, such as time parameters continuing the call in 20 minutes, 2 hours, or 3 days from the time of the request for the continuation. A variety of other default parameters may also be configured to adapt to a variety of needs and preferences.

Operatively, a user may provide input requesting continuation of a call in a variety of ways. In one embodiment (not shown), a user connected to a call via a user computing device 110 may provide input requesting continuation of the call by clicking a link or selecting a corresponding continuation option via an interface. In response to the appropriate input, the user computing device 110 can generate and transmit the request for the prospective call (e.g., requesting continuation of the call at a future time and/or date). In another embodiment (not shown), a user connected to a call via a handheld 125 may provide input requesting continuation of the call by selecting or depressing a soft or hard key on the handheld 125 corresponding to the option for requesting continuation. In response to the appropriate input, the handheld 125 can generate and transmit the request for the prospective call. Although not shown, in yet another embodiment, a user connected to a call via a telephone 120 in communication with an IVR 115 may also continue calls. For example, a user operating a telephone 120 in communication with an IVR 115 may depress the pound key, for example, to input a request during or after the call to continue the call at a future time and/or date. In response to the appropriate input, the IVR 115 can generate and transmit the request for the prospective call.

In one embodiment, requests for prospective calls generated and transmitted as a result of continuing calls may or may not require acceptance of the request to be added to the caller's and callee's respective call lists. For example, the parameters associated with the caller's profile may provide for the automatic inclusion of continued calls to her call list. Similarly, the parameters associated with the caller's profile may require acceptance of such requests for inclusion of continued calls to her call list. A variety of other parameters may also be configured to adapt to a variety of needs and preferences.

d. Notifications of Requests for Prospective Calls

In one embodiment, after receiving a request for a prospective call, the call server 100 identifies the call lists associated with the request for the prospective call (Block 410). For example, the call server 100 identifies the caller and the callee(s) (e.g., via their user profiles or other uniquely identifiable attributes) associated with the request. The call server 100 then updates the corresponding call lists to reflect the request for the prospective call.

Figure 16:
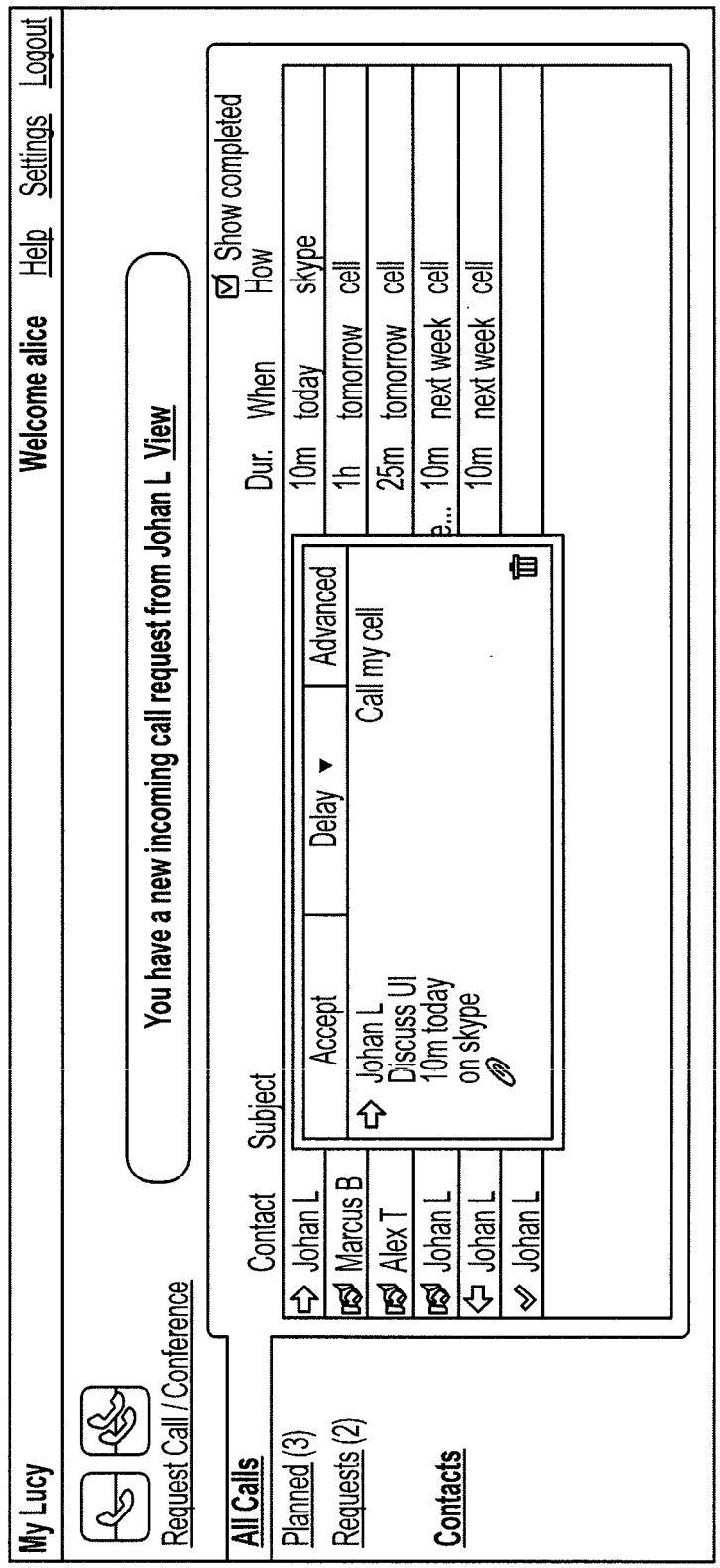
Figure 17:
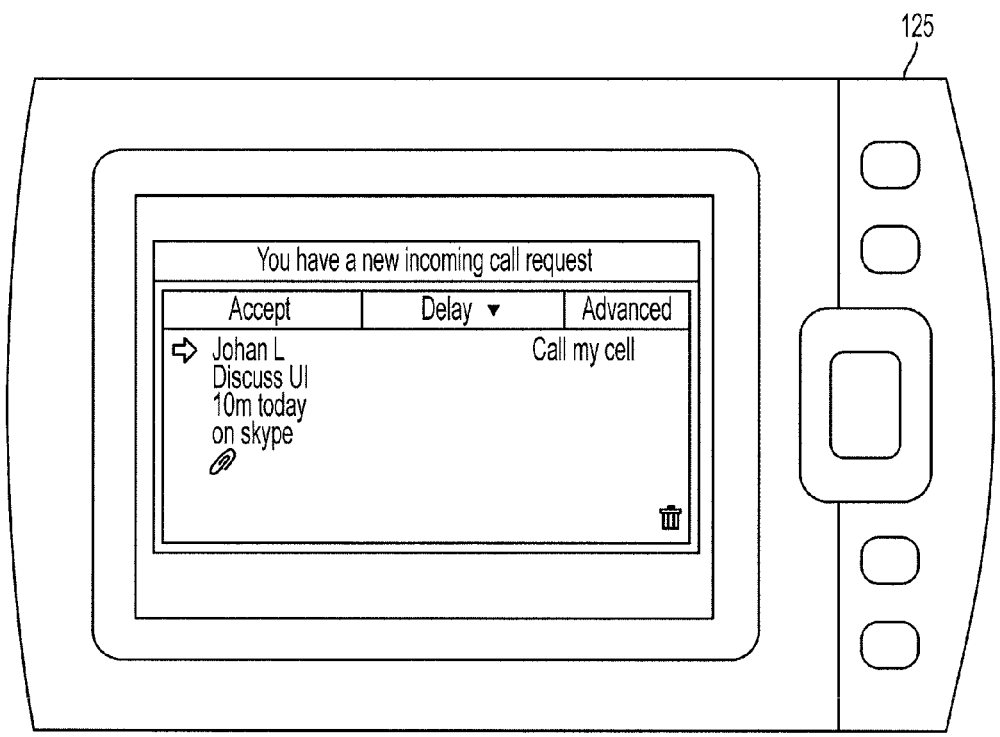

In one embodiment, the call server 100 may also generate a notification to the callee(s) associated with the request (Block 415). For example, the call server 100 may generate and transmit a Short Message Service ("SMS") notification, a Multimedia Message Service ("MMS") notification, or an email notification to the callees to inform them of the received request. In a particular embodiment, as shown in FIGS. 15-17, the call server 100 may generate and transmit a notification to or via an application on the user's computing device 110 or handheld 125. In response to the notification, the callees (e.g., operating a user computing device 110, a telephone 120 in communication with an IVR 115, or a handheld 125) may accept, reject, delay, or change the request for the prospective call (Block 420). In turn, the call server 100 receives the acceptance, rejection, delay, or change of the request for the prospective call and updates the corresponding call lists accordingly (Blocks 500, 505, 510 of FIG. 5). For instance, if the callees accept the request for the prospective call, the call server 100 updates the corresponding call lists to include the prospective call and indicates that the prospective call has been accepted. Similarly, if one or more callees reject, change, or delay the request, the caller and remaining callees may be notified of the rejection, change, or delay and the corresponding call lists may be updated accordingly. It should be noted that not all participants to a request for a prospective call need accept for the prospective call to occur. In fact, a prospective call may only require a caller and a single callee.

In one embodiment, after a prospective call has been accepted and included on a user's call list, updates and/or changes to the prospective call can be made. For example, a user (e.g., a caller or callee operating a user computing device 110, a telephone 120 in communication with an IVR 115, or a handheld 125) may add additional call subjects or participants to the prospective call. Further, a user may change the suggested call time or suggested call time window for the prospective call, such as requesting the call take place on Wednesday between 4:00 pm and 7:00 pm Eastern instead of Monday between 4:00 pm and 7:00 pm Eastern. Correspondingly, a callee may decide to change the prospective call parameters by indicating that she will initiate the call using one of her associated communication means—instead of the caller initiating the call. That is, a callee for a prospective call can change her status to a caller (and identify the use of a different communication means), and a caller likewise can become a callee. Based on the needs and preferences of the users, the changes and/or updates may be automatically updated on the corresponding call lists or may require confirmation/acceptance before reflecting the update.

4. Automatic Initiation of Calls

In one embodiment, once a prospective call has been accepted, the call server 100 can determine when the participants of the prospective call are available and automatically initiate a call. For example, as discussed, each user (e.g., caller/callee) has a current call status that is stored by the call server 100 (Block 515). Thus, for instance, when the call server 100 determines that (a) the current call status associated with the caller indicates that the caller is available and (b) the current call status associated with the callee indicates that the callee is available (Blocks 520, 525), the call server 100 can automatically initiate a call between them (Block 605). Based on user preferences, the call may originate from a caller device (e.g., user computing device 110, telephone 120, or handheld 125), a callee device (e.g., user computing device 110, telephone 120, or handheld 125), or the call server 100.

As indicated previously, the current call status may be manually or automatically updated. For example, a user may manually update her current call status by accessing the call server 100 via a user computing device 110, a telephone 120 in communication with an IVR 115, or a handheld 125. Similarly, the user's current call status may be automatically detected and updated. For example, when a user makes a call, her current call status can be automatically identified as being unavailable and communicated to the call server 100. Correspondingly, when the user completes the call, her current call status can be automatically identified as being available and communicated to the call server 100.

In addition to determining the current call status of the participants of the prospective call, the call server 100 can initiate the call in accordance with the parameters defined in the request for the prospective call. For example, the call server 100 can determine if the current call status associated with the participants indicates that they are available at the suggested call time, e.g., determining if the participants are available at 5:00 pm Eastern on Feb. 11, 2012 and initiating the call accordingly. Similarly, the call server 100 can determine if the current call status associated with the participants indicates that they are available within the suggested call time window, e.g., determining if the participants are available at some time during 1:00 pm and 5:00 pm Eastern on Feb. 11, 2012 and initiating the call accordingly. With regard to the suggested call time window, the call server 100 may determine the participants availability at periodic intervals during the suggested call time window—such as every 5 seconds, 3 minutes, or 9 minutes. The call server 100 may also initiate the call for specific devices associated with the corresponding user profiles and/or defined in the parameters for the prospective call. For example, the call server 100 may initiate the call from Alice's home phone to Alex's cellular phone, and Marcus' Skype ID.

Figure 6:
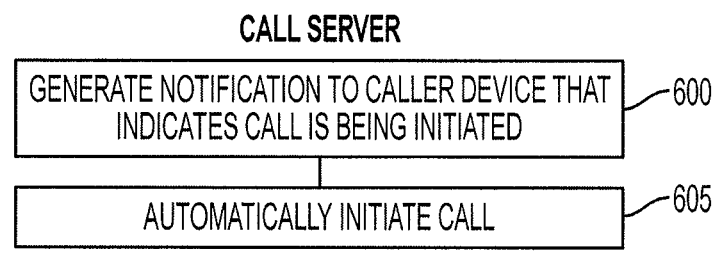

In one embodiment, prior to initiating a call as indicated in Block 600 of FIG. 6, the call server 100 may generate a notification to the caller to confirm that the caller desires to proceed with the call. In addition to generating the notification, the call server 100 may require input indicating that the caller wishes to proceed with the call before automatically initiating the call. In various embodiments, this may provide the caller with the ability to confirm that she is actually ready for the call before the call is initiated. In another embodiment, the call server 100 may generate a notification to the caller and the callee(s) to confirm that all participants desire to proceed with the call. In addition to generating the notification, the call server 100 may require input indicating that the participants wish to proceed with the call before automatically initiating the call. In various embodiments, the notification(s) may be viewable using, for example, a user computing device 110 or handheld 125. Similarly, the notification may be provided to a user via telephone 120 with the assistance of an IVR 115, e.g., please press 2 if you would like to initiate the call to Alex and Marcus now or press 3 to delay the call. A variety of other techniques and approaches may also be used.

5. Call Subject

As discussed above, one embodiment of the present invention provides for contextualized calls. For example, a user (e.g., operating a user computing device 110, a telephone 120 in communication with an IVR 115, or a handheld 125) may enter the subject of a call that will be displayed to a callee when or as the call is connected. For example, using (a) unstructured supplementary service data ("USSD") capabilities of phones, (b) web technologies, (c) caller identification-related technologies, or (d) other solutions (e.g., email, chat services, SMS/MMS messaging, and/or the like), users can input the subject of a call via, for example, a user computing device 110, a telephone 120 in communication with an IVR 115, or a handheld 125. With the call subject input, the call subject can be displayed or otherwise communicated to the callee (e.g., via a callee device) to aid the callee in determining whether to accept, reject, or delay the call.

In one embodiment, when or as the call is connected, the call subject may be displayed via (a) a screen or window on a user computing device 110 or handheld 125 or (b) a telephone 120 display as part of caller identification-related information. Similarly, the call subject may be communicated to a callee via telephone 120 with the assistance of an IVR 115, e.g., Alex is calling to discuss the new MyLucy implementation, please press (a) 2 to accept the call from Alex, (b) 3 to reject the call, or (c) 4 to delay the call. In various embodiments, this may provide the callee with information as to the importance of the call and aid the callee in determining whether to accept, reject, or delay the call.

6. Urgent/Insistent Messages and Calls

In one embodiment, even if (a) a callee rejects a call or (b) a current call status associated with the callee indicates that the callee is unavailable, a caller may still need to communicate important information (e.g., via calls or messages) to the callee. For example, consider a scenario in which a user (e.g., callee) is in a meeting and has set her current call status to unavailable or rejects an incoming call, but a caller has information that is important for the callee's meeting. In such a scenario, the caller may still need to communicate with the callee despite the callee, for example, rejecting the call. In one embodiment, to communicate with the callee, the caller can be automatically provided with the option to (a) generate and transmit an urgent/insistent message to the callee or (b) initiate an urgent/insistent call to the callee. In certain embodiments, only certain callers (e.g., users) with urgent/insistent rights provided by the caller can be provided with the urgent/insistent message/call options when calling the callee. For example, each user can define a user group of participants (or individually identify participants) that will have the ability/right to communicate urgent/insistent messages or calls to her in the event she is unavailable or otherwise rejects a call. In other words, the user can limit the participants who have the ability to communicate urgent/insistent messages and calls.

Figure 7:
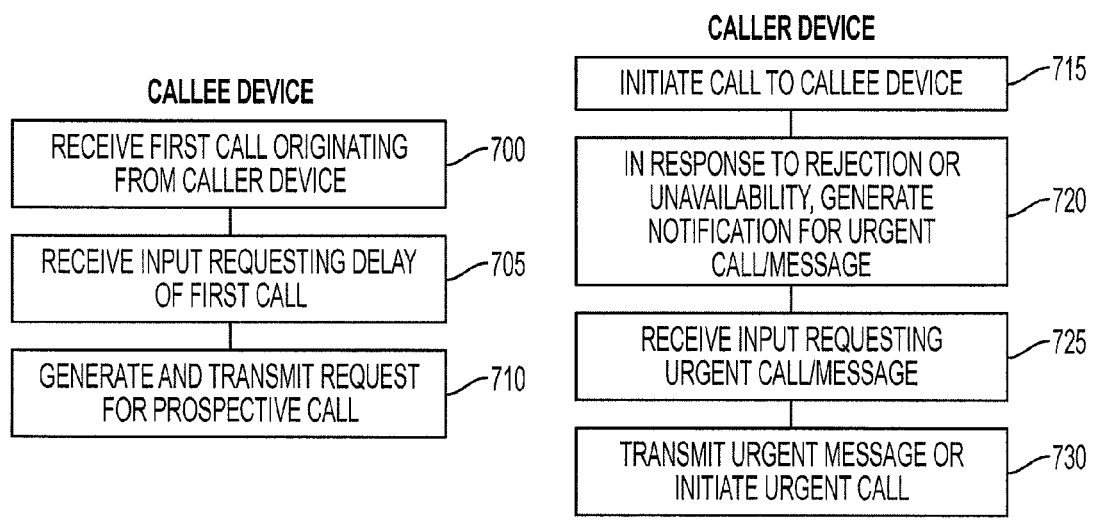
Figure 8:
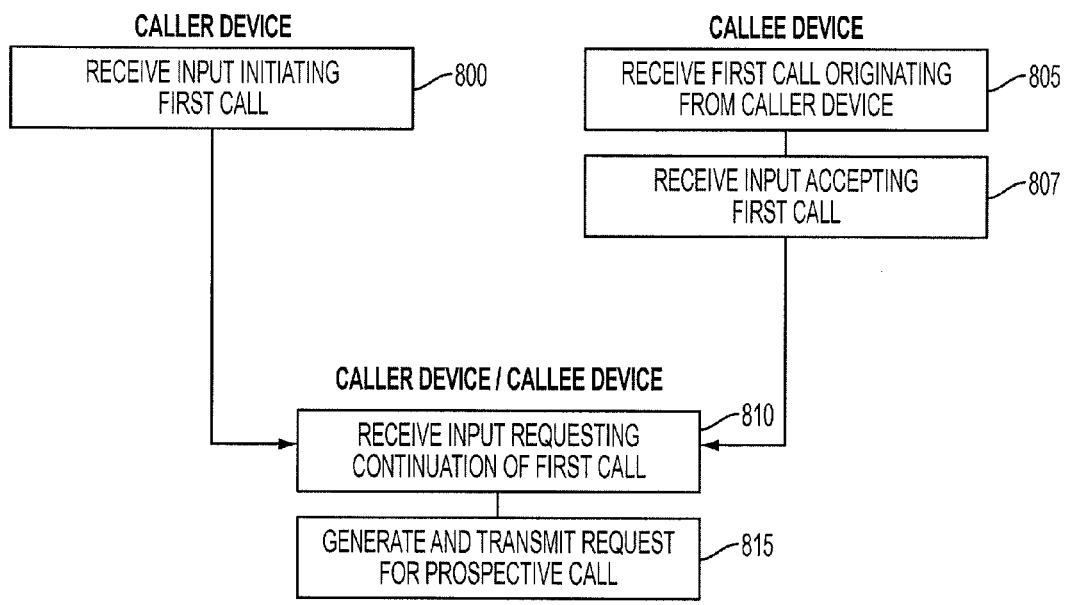

Operatively, in one embodiment, as shown in Block 715 of FIG. 7, a callee device (e.g., user computing device 110, telephone 120, or handheld 125) can initiate a call to a caller device (e.g., user computing device 110, telephone 120, or handheld 125). If the callee rejects the call, the caller device is notified of the call rejection. In response to the call rejection, the caller device can automatically cause display of (or otherwise communicate) an option for the caller to generate and transmit an urgent/insistent message to the callee. For example, the caller device may automatically generate a notification to the caller about the option to generate and transmit an urgent/insistent message to the callee as a result of the call rejection (Block 720). As discussed, this may require the caller to have previously been granted urgent/insistent message/call rights by the callee. The notification may be viewable using, for example, a user computing device 110 or handheld 125. Similarly, the notification may be provided to the caller via telephone 120 with the assistance of an IVR 115, e.g., Johan L rejected the call, please press 2 if you would like to send an urgent/insistent message to Johan L. In response to input indicating that the caller would like to communicate an urgent/insistent message to the callee, the caller device may provide, for example, (a) a form for the caller to populate using the user computing device 110 or handheld 125 or (b) an interactive menu for the caller to navigate using a telephone 120 in communication with an IVR 115 (Block 730). Upon receiving input from the caller requesting the urgent/insistent message, the caller device can transmit the message to a callee device (Block 730). The message may be transmitted to one or more callee devices and/or accounts (e.g., Google ID, cellular phone number, etc.) identified as the callee's communications means in her profile. For example, the message may be communicated near simultaneously via SMS/MMS to the callee's cellular phone and via email to her Google ID.

Operatively, in another embodiment, as shown in Block 715 of FIG. 7, a callee device (e.g., user computing device 110, telephone 120, or handheld 125) can initiate a call to a caller device (e.g., user computing device 110, telephone 120, or handheld 125). If the current call status associated with the callee indicates that the callee is unavailable, the caller device is notified of the callee's unavailability. In response to the unavailability of the callee, the caller device can automatically cause display of (or otherwise communicate) an option for the caller to initiate an urgent/insistent call to the callee. For example, the caller device may automatically generate a notification to the caller about the option to initiate an urgent/insistent call to the callee as a result of the unavailability of the callee (Block 720). As discussed, this may require the caller to have previously been granted urgent/insistent message/call rights by the callee. In one embodiment, the notification may be viewable using, for example, a user computing device 110 or handheld 125. In another embodiment, the notification may be, for example, a specific ring, ring tone, or vibration pattern on a handheld 125. Similarly, the notification may be provided to the caller via telephone 120 with the assistance of an IVR 115, e.g., Johan L is unavailable, please press 2 if you would like to initiate an urgent/insistent call to Johan L. In response to input indicating that the caller would like to initiate an urgent/insistent call to the callee, the caller device can initiate an urgent/insistent call to the callee device that will be connected to the callee device despite the current call status associated with the callee indicating that the callee is unavailable. In various embodiments, this approach may enable a callee who is not accepting normal incoming calls to receive urgent/insistent calls.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for receiving calls, the method comprising:
   receiving, via a callee device, a first call originating from a caller device;
   receiving input, via the callee device, requesting delay of the first call;
   after receiving input requesting delay of the first call, automatically providing, via the callee device, a request for a prospective call to a call server, wherein the request for the prospective call (a) defines parameters for the prospective call and (b) identifies participants of the prospective call comprising at least a caller and a callee; and
   after a determination by the call server that (a) a current call status associated with the caller indicates that the caller is available and (b) a current call status associated with the callee indicates that the callee is available, automatically receiving a second call via the callee device, wherein the second call (a) is at least between the callee device and the caller device, (b) is initiated by the call server, and (c) is based at least in part on the request for the prospective call.

2. The method of claim 1 further comprising, after a determination that (a) a current call status associated with the caller indicates that the caller is available and (b) a current call status associated with the callee indicates that the callee is available, receiving a second call from the caller device.

3. The method of claim 2, wherein the parameters for the prospective call are selected from the group consisting of (a) a suggested call time and (b) a suggested call time window.

4. The method of claim 3, wherein determining the current call status associated with the caller and the current call status associated with the callee is executed within the suggested call time window.

5. The method of claim 1, wherein receiving the first call originating from the caller device further comprises causing display of a call subject.

6. A computer program product for receiving calls, the computer program product comprising at least one non-transitory computer-readable storage medium having computer-readable program code portions stored therein, the computer-readable program code portions comprising:
   an executable portion configured to receive a first call originating from a caller device;
   an executable portion configured to receive input requesting delay of the first call;
   an executable portion configured to, after receiving input requesting delay of the first call, automatically provide, via a callee device, a request for a prospective call to a call server, wherein the request for the prospective call (a) defines parameters for the prospective call and (b) identifies participants of the prospective call comprising at least a caller and a callee; and
   an executable portion configured to, after a determination by the call server that (a) a current call status associated with the caller indicates that the caller is available and (b) a current call status associated with the callee indicates that the callee is available, automatically receive a second call via the callee device, wherein the second call (a) is at least between the callee device and the caller device, (b) is initiated by the call server, and (c) is based at least in part on the request for the prospective call.

7. The computer program product of claim 6 further comprising an executable portion configured to, after a determination that (a) a current call status associated with the caller indicates that the caller is available and (b) a current call status associated with the callee indicates that the callee is available, receive a second call from the caller device.

8. The computer program product of claim 7, wherein the parameters for the prospective call are selected from the group consisting of (a) a suggested call time and (b) a suggested call time window.

9. The computer program product of claim 6, wherein determining the current call status associated with the caller and the current call status associated with the callee is executed within a suggested call time window.

10. The computer program product of claim 6, wherein receiving the first call originating from the caller device further comprises causing display of a call subject.

11. A method for receiving calls, the method comprising:
    receiving, via a callee device, a first call originating from a caller device;
    receiving input, via the callee device, accepting the first call;
    receiving input, via the callee device, requesting continuation of the first call;
    after receiving input requesting continuation of the first call, automatically providing, via the callee device, a request for a prospective call to a call server, wherein the request for the prospective call (a) defines parameters for the prospective call and (b) identifies participants of the prospective call comprising at least a caller and a callee; and
    after a determination by the call server that (a) a current call status associated with the caller indicates that the caller is available and (b) a current call status associated with the callee indicates that the callee is available, automatically receiving a second call via the callee device, wherein the second call (a) is at least between the callee device and the caller device, (b) is initiated by the call server, and (c) is based at least in part on the request for the prospective call.

12. The method of claim 11 further comprising, after a determination that (a) a current call status associated with the caller indicates that the caller is available and (b) a current call status associated with the callee indicates that the callee is available, receiving a second call from the caller device.

13. The method of claim 12, wherein the parameters for the prospective call are selected from the group consisting of (a) a suggested call time and (b) a suggested call time window.

14. The method of claim 13, wherein determining the current call status associated with the caller and the current call status associated with the callee is executed within the suggested call time window.

15. The method of claim 11, wherein receiving the first call originating from the caller device further comprises causing display of a call subject.

16. A computer program product for receiving calls, the computer program product comprising at least one non-transitory computer-readable storage medium having computer-readable program code portions stored therein, the computer-readable program code portions comprising:
   an executable portion configured to receive a first call originating from a caller device;
   an executable portion configured to receive input accepting the first call;
   an executable portion configured to receive input requesting continuation of the first call;
   an executable portion configured to, after receiving input requesting continuation of the first call, automatically provide, via a callee device, a request for a prospective call to a call server, wherein the request for the prospective call (a) defines parameters for the prospective call and (b) identifies participants of the prospective call comprising at least a caller and a callee; and
   an executable portion configured to, after a determination by the call server that (a) a current call status associated with the caller indicates that the caller is available and (b) a current call status associated with the callee indicates that the callee is available, automatically receiving a second call via the callee device, wherein the second call (a) is at least between the callee device and the caller device, (b) is initiated by the call server, and (c) is based at least in part on the request for the prospective call.

17. The computer program product of claim 16 further comprising an executable portion configured to, after a determination that (a) a current call status associated with the caller indicates that the caller is available and (b) a current call status associated with the callee indicates that the callee is available, receive a second call from the caller device.

18. The computer program product of claim 17, wherein the parameters for the prospective call are selected from the group consisting of (a) a suggested call time and (b) a suggested call time window.

19. The computer program product of claim 18, wherein determining the current call status associated with the caller and the current call status associated with the callee is executed within the suggested call time window.

20. The computer program product of claim 16, wherein receiving the first call originating from the caller device further comprises causing display of a call subject.

21. A method for receiving calls, the method comprising:
   receiving input, via a caller device, initiating a first call with a callee device;
   receiving input, via the caller device, requesting continuation of the first call;
   after receiving input requesting continuation of the first call, automatically providing, via the caller device, a request for a prospective call to a call server, wherein the request for the prospective call (a) defines parameters for the prospective call and (b) identifies participants of the prospective call comprising at least a caller and a callee; and
   after a determination by the call server that (a) a current call status associated with the caller indicates that the caller is available and (b) a current call status associated with the callee indicates that the callee is available, automatically receiving a second call via the caller device, wherein the second call (a) is at least between the callee device and the caller device, (b) is initiated by the call server, and (c) is based at least in part on the request for the prospective call.

22. The method of claim 21 further comprising, after a determination that (a) a current call status associated with the caller indicates that the caller is available and (b) a current call status associated with the callee indicates that the callee is available, receiving a second call from the callee device.

23. The method of claim 22, wherein the parameters for the prospective call are selected from the group consisting of (a) a suggested call time and (b) a suggested call time window.

24. A computer program product for receiving calls, the computer program product comprising at least one non-transitory computer-readable storage medium having computer-readable program code portions stored therein, the computer-readable program code portions comprising:
   an executable portion configured to receive input initiating a first call with a callee device;
   an executable portion configured to receive input requesting continuation of the first call;
   an executable portion configured to, after receiving input requesting continuation of the first call, automatically provide, via a caller device, a request for a prospective call to a call server, wherein the request for the prospective call (a) defines parameters for the prospective call and (b) identifies participants of the prospective call comprising at least a caller and a callee; and
   an executable portion configured to, an executable portion configured to, after a determination by the call server that (a) a current call status associated with the caller indicates that the caller is available and (b) a current call status associated with the callee indicates that the callee is available, automatically receive a second call via a caller device, wherein the second call (a) is at least between the callee device and the caller device, (b) is initiated by the call server, and (c) is based at least in part on the request for the prospective call.

25. The computer program product of claim 24 further comprising an executable portion configured to, after a determination that (a) a current call status associated with the caller indicates that the caller is available and (b) a current call status associated with the callee indicates that the callee is available, receive a second call from the callee device.

26. The computer program product of claim 25, wherein the parameters for the prospective call are selected from the group consisting of (a) a suggested call time and (b) a suggested call time window.

* * * * *